March 3, 1942. R. S. NELSON Re. 22,043
REFRIGERATION
Original Filed Aug. 8, 1936
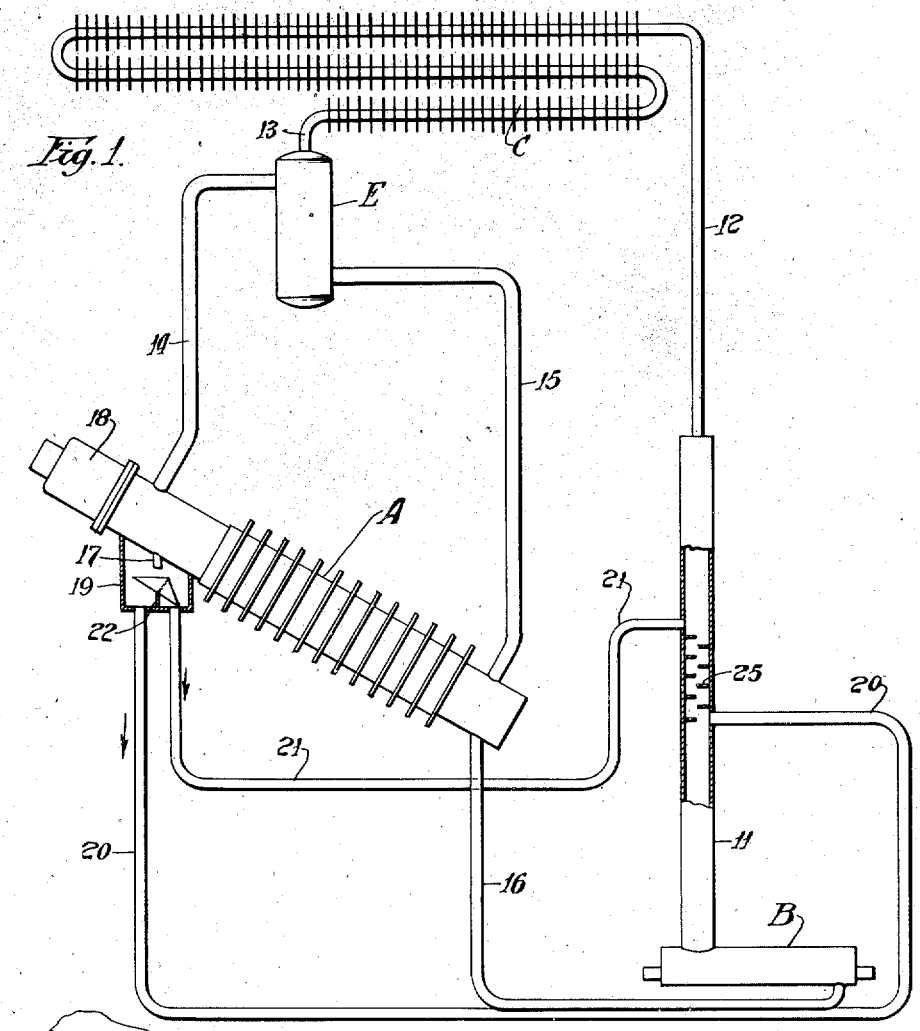
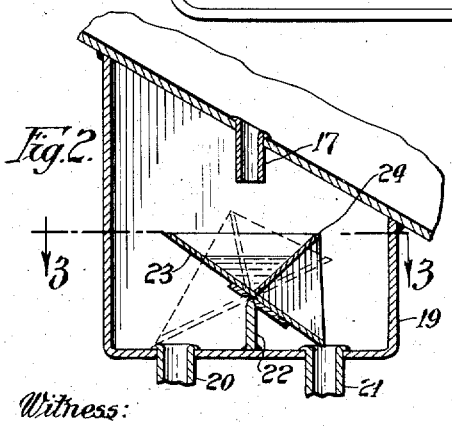
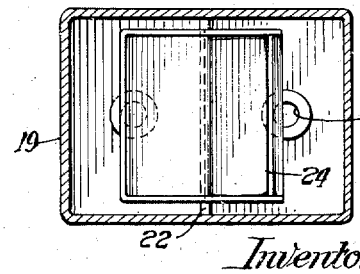
Witness:
E. Campouni
Inventor:
Rudolph S. Nelson,
By: Harry S. Duncan
Attorney.

Reissued Mar. 3, 1942

Re. 22,043

UNITED STATES PATENT OFFICE 22,043

REFRIGERATION

Rudolph S. Nelson, Larchmont, N. Y., assignor to The Hoover Company, North Canton, Ohio, a corporation of Ohio Original No. 2,167,903, dated August 1, 1939, Serial No. 94,936, August 8, 1936. Application for reissue January 22, 1941, Serial No. 375,480

19 Claims. (Cl. 62—119.5)

This invention relates to continuous absorption refrigerating systems and more particularly to an analyzer and associated parts adapted to aid in the separation of refrigerant vapor from the vapor of the absorption liquid used within such a system.

The use of analyzers in continuous absorption refrigerating systems are known. Example of their use in continuous absorption systems adapted for household refrigerating systems are disclosed in the co-pending applications of Nelson, Serial No. 63,097 filed Feb. 10, 1936, and the application of Coons, Serial No. 81,676 filed May 25, 1936.

It is an object of the present invention to provide and improved analyzer and to provide improved means for dividing absorption liquids leaving the absorber of the refrigerating systems into two streams, one of which enters the analyzer at one level and another of which enters the analyzer at another level.

It is another object of the invention to provide an improved analyzer system in which only part of the absorption liquid flowing from the absorber to the boiler is used in the analyzing action.

Other objects and advantages reside in certain novel features of the arrangement and the construction of parts as will be apparent from the following description taken in connection with the accompanying drawing in which:

Figure 1 is a diagram of a continuous absorption refrigerating system with an analyzer shown partly in cross section incorporated therein and illustrating one embodiment of the present invention.

Figure 2 is an enlarged vertical cross-sectional view of a solution divider employed in the arrangement of Figure 1 and Figure 3 is a horizontal cross-sectional view of the solution divider, the view being taken on the line 3—3 of Figure 2.

Many expedients have been proposed for utilizing the high grade heat energy contained in the raw vapor expelled from the boiler of an absorption refrigerating system using three fluids. These expedients have included analyzers, submerged analyzers, auxiliary boilers heated by the rectifiers and so forth. In spite of the prior attempts to economize, certain losses have entailed. The weight of the weak aqua flowing in a given unit of time from the boiler to the absorber is always less than the weight of the strong aqua flowing from the absorber to the boiler during that interval of time by the quantity of refrigerant taken up in the absorber. Hence it is impossible to heat up the strong aqua flowing through the boiler to the boiler temperature even if a perfect solution heat exchanger were used, because the quantity of heat required to heat up the strong aqua is greater than the quantity of heat available in the weak aqua flowing in the same interval of time. Thus the weak aqua always enters the boiler or analyzer at a temperature below its boiling point and it must be heated up to that boiling point by an additional expenditure of heat.

In the arrangement shown in Figure 1, means is provided for utilizing the heat contained in the vapor leaving the boiler for heating the strong aqua. The system shown is of the type in which three fluids are employed, namely, an absorption liquid, a refrigerant and an inert gas. Water, ammonia, and nitrogen may be used, for example.

The refrigerating system shown consists of a boiler designated B, a condenser C, an evaporator E and an absorber A, these parts being connected by various conduits to form the complete refrigerating system.

In the arrangement illustrated in Figure 1, it is intended that the absorption liquid be lifted upwardly in the absorber by means of a suitable pumping means so that no gas lift pump is employed. The refrigerant vapor and some of the absorption liquid vapors generated in the boiler pass upwardly through the vertical pipe 11 which acts as both an analyzer and a rectifier, and then passes through the conduit 12 into the condenser C. The refrigerant condensing in the condenser C flows through the conduit 13 into the evaporator where it evaporates into the inert gas and is conveyed into the absorber.

The evaporator and the absorber may be connected by two inert gas conduits 14 and 15 which may be in heat exchange relation, although this is not illustrated on the drawing.

Absorption liquid flows from the boiler B through the conduit 16, which may be termed the outgoing circuit, into the bottom of the absorber. This flow may be by gravity, the liquid level standing in the pipe 11 being sufficiently high to be above the point of entrance of the conduit 16 into the bottom of the absorber. By some suitable pumping means such as an ordinary centrifugal pump or other known types of liquid circulating devices, the absorption liquid may be caused to flow upwardly through the absorber and leave the same through the small conduit 17 near the upper end.

For circulating absorption liquid upwardly through the absorber A and for causing the inert gas to circulate, an arrangement similar to that disclosed in the co-pending application of R. S. Nelson, Serial No. 45,528 filed October 18, 1935 may be employed. The fluid circulating mechanism may be driven by an electric motor 18 as illustrated in Figure 1. Since the fluid circulating mechanism forms no part of the present invention it has not been shown and described in detail herein, however.

The absorption liquid leaving the absorber through the conduit 17 flows into a small solution dividing chamber 19 where it is divided into two streams, one of which flows through the conduit 20 and the other of which flows through the conduit 21. Conduits 20 and 21 constitute the return circuit for the strong absorbent medium. Both conduits 20 and 21 discharge into the vertical cylinder 11, the conduit 21 being connected thereto at the higher level.

Either or both of the conduits 20 and 21 may be in heat exchange relation with a portion of the conduit 16. It is preferable, however, to have only the conduit 20 pass in heat exchange relation with the absorption liquid leaving the boiler through the conduit 16 and this construction is illustrated on the drawing.

The solution divider within the cylinder or vessel 19 may consist of a pivot point or knife edge 22 which divides the vessel 19 into a left and right hand chamber. Upon this, a tiltable dish 23 is pivoted. The dish 23 may be provided with a partition 24 which divides it into two cups as illustrated. The two cups may be of different volumes so as to proportion the solution in any desired way and may be weighted to maintain the proper balance. It will be seen that with the construction illustrated absorption liquid dripping through the conduit 17 falls in either the left or right hand cup of the dish 23 depending upon its position. Upon the weight in the cup being sufficient the dish will tilt so that the other cup may be filled. In this way the solution may be carefully divided or proportioned.

Located within the vertical pipe 11 are a number of baffle plates or other means for providing an extended surface as illustrated at 25. The pipe 21 is preferably connected above the baffle plates and the pipe 20 below the same.

If, now the solution divided within the vessel 19 is so constructed as to divide the two streams into a larger and a smaller one, the larger stream may be such that the quantity of heat required to raise its temperature to the boiling point will be substantially that quantity available in the weak aqua flowing from the boiler through the conduit 16. A heat transfer of this exact quantity may thus be effected from the conduit 16 to the conduit 20. This stream may then enter the analyzer and the boiler but little additional heat will be required to generate the refrigerant therefrom.

The remainder of the strong aqua, that is, the smaller portion which flows through the conduit 21 may correspond roughly in heat capacity to the heat capacity of the vapors leaving the boiler-analyzer assembly. If this smaller portion of the strong aqua does not pass in heat exchange relation with the solution in the conduit 16, it may be brought directly from the absorber in heat exchange with the hot vapors in the analyzer. Heat exchange may then take place between the vapors and the strong aqua entering the analyzer and flowing down over the baffle plates 25 therein. The vapors within the analyzer should be brought into as intimate contact with the solution on the plates 25 as is possible and to this end either of the plates 25 or all of them may be located below the normal solution level within the boiler so that the best heat exchange possible may be obtained. Counterflow of liquid and gas, as illustrated in the construction of Figure 1 is also preferable.

The arrangement illustrated in Figure 1 does not show means for draining the evaporator but it will be obvious to those skilled in the art that any liquid which does not evaporate in the evaporator may be added to the absorption liquid flowing through the conduit 21 and thus supply to the analyzer either through the conduit 21 or above the point of entrance of the conduit 21 in the analyzer to aid in the removal of absorption liquid vapors from the refrigerant vapors passing upwardly therethrough.

By using an analyzer constructed in accordance with the present invention it may be possible to eliminate the rectifier entirely in some instances although in the arrangement shown the upper end of the vertical pipe 11 may be provided with baffle plates inside or with heat radiating fins on the outside to provide some rectifier action.

While the arrangement illustrated in Figure 1 is of a known type of refrigerating system in which an inert gas is used and in which the absorption liquid is caused to flow upwardly through the absorber, it is obvious that the present invention may be used in connection with other systems such as those in which no inert gas is employed or in which the absorption liquid flows downwardly through the absorber, any arrangement in which the solution leaving the absorber may be divided into two streams being all that is necessary to carry out the principles of the invention.

While only one embodiment of the invention has been shown and described herein, therefore, it is obvious that many changes may be made in the arrangement and construction of parts without departing from the spirit of the invention or the scope of the annexed claims.

I claim:

1. An absorption refrigeration system comprising a boiler, an analyzer, a condenser, an evaporator, and an absorber connected in circuit, said circuit including means for the circulation of absorption solution between said boiler and said absorber, said circuit being characterized by the provision of means for delivering independent streams of absorption solution to said analyzer at spaced points therealong whereby the analyzing effect of said independent streams upon the fluids in said analyzer is distributed over different portions of said fluids.

2. An absorption refrigeration system comprising a boiler, an analyzer, a condenser, an evaporator, and an absorber connected in circuit, said circuit including means for the circualtion of absorption solution between said boiler and said absorber, said circuit being characterized by the provision of means for delivering a plurality of independent streams of absorption solution to said analyzer at vertically spaced points, and being so arranged as to preheat one of said streams to a higher temperature than another of said streams.

3. An absorption refrigeration system comprising a boiler, an analyzer, a condenser, an evaporator, and an absorber connected in circuit, said circuit including means for the circulation of absorption solution between said boiler and said absorber, said circuit being characterized by the provision of means for dividing a stream of absorption solution into a plurality of independent streams, means for conducting one of said streams directly to said analyzer, means for preheating another of said streams, and means for delivering said preheated stream to said analyzer at a point spaced from the point of entrance of said one stream.

4. An absorption refrigeration system including a boiler-analyzer assembly, a condenser, an evaporator and an absorber connected in circuit, said system containing a refrigerant and an absorbent medium therefor and being so charged that the normal operating level of absorption solution in said assembly during the operation of the system is intermediate the upper and lower portions of said analyzer, said circuit being characterized by the provision of conduits for returning a plurality of streams of enriched solution from said absorber to said boiler-analyzer assembly, one of said conduits discharging thereinto at a point above the normal solution level and another conduit discharging thereinto at a point below the normal solution level.

5. An absorption refrigeration system as recited in claim 4 further characterized by the fact that said circuit is so arranged as to preheat one of the streams of enriched solution flowing to the boiler-analyzer assembly.

6. An absorption system having a boiler assembly, a condenser, an evaporator and an absorber connected in circuit, said circuit including an absorption solution circuit between said boiler assembly and said absorber, said absorption solution circuit being characterized by a plurality of return passageways for enriched solution flowing from the absorber to the boiler assembly and discharging into the latter at spaced points, and means in addition to the conduits required to form said return passageways operable to divide the enriched solution therebetween.

7. An absorption system having a boiler assembly, a condenser, an evaporator and an absorber connected in circuit, said circuit including an absorption solution circuit between said boiler assembly and said absorber, said absorption solution circuit being characterized by a plurality of return passageways for enriched solution flowing from the absorber to the boiler assembly and discharging into the latter at spaced points, and means in addition to the conduits required to form said return passageways operable to divide the enriched solution therebetween, said dividing means being sealed within said system and arranged to divide the absorption solution into a plurality of streams of pre-determined relative size.

8. An absorption system having a boiler-analyzer assembly, a condenser, an evaporator and an absorber connected in circuit, said circuit including an absorption solution circuit between said boiler-analyzer assembly and said absorber, said circuit being characterized by the provision of means forming a plurality of return passageways for rich solution flowing from said absorber to spaced points in an upper portion of said boiler-analyzer assembly, and means in addition to the means necessary to form said return passageways sealed within said system and operable upon circulation of absorption solution in its circuit to divide said solution into streams of predetermined size between said return passageways.

9. In an absorption refrigerating apparatus, a generator, an elongated analyzer, an absorber, means for conducting weak absorption liquid from said generator to said absorber, means for conducting a portion of the strong absorption liquid from said absorber to a point near one end of the analyzer, means for conducting another portion of said strong absorption liquid from said absorber in heat exchange relation with said weak absorption liquid to a point near the other end of said analyzer and means for conducting liquid from said other end of the analyzer to said generator and for conducting vapor from said generator to said other end of said analyzer.

10. In an absorption refrigerating apparatus, an absorber having a liquid sump, a generator having a chamber located below the liquid level in said sump, an analyzer below said level and above said chamber, means for conducting weak absorption liquid from said generator to said absorber, conduit means for conducting a portion of the strong absorption liquid from said sump to the generator in heat exchange relation with said weak liquid, means for conducting another portion of said strong absorption liquid from said sump by gravity flow to said analyzer, and means including at least a portion of said conduit means for conducting liquid from said analyzer to said chamber by gravity flow and vapor from said generator to said analyzer.

11. In an absorption refrigerating apparatus, a generator, an absorber having a liquid dividing chamber, an elongated analyzer positioned below said chamber and having one end higher than the other for gravity circulation of liquid therethrough, a conduit connecting the lower end of said analyzer to said generator, means for conducting absorption liquid from said generator through said absorber and to said chamber, means for conducting one stream of strong absorption liquid from said chamber to the upper end of said analyzer and means for conducting another stream of strong absorption liquid from said chamber to said conduit between said generator and the lower end of said analyzer and in heat exchange relation with weak absorption liquid flowing from said generator to said absorber.

12. In an absorption refrigerating apparatus, a generator, an absorber having a sump, an elongated analyzer positioned below the liquid level in said sump, means for conducting absorption liquid from said generator through said absorber and to said sump, means for conducting one stream of strong absorption liquid to one end of said analyzer, means for conducting another stream of strong absorption liquid from said sump to the other end of said analyzer and in heat exchange with weak absorption liquid flowing from said generator to said absorber and common means for conducting both streams of strong absorption liquid from said other end of said analyzer to said generator.

13. In an absorption refrigerating apparatus, a generator, a condenser, an absorber having a sump, an analyzer positioned below the liquid level in said sump, means for conducting absorption liquid from said generator through said absorber to said sump including means for raising the absorption liquid to a height from which it flows to said sump by gravity, a conduit for leading vapors from said analyzer to said condenser, conduit means for conducting one stream of strong absorption liquid from said sump to said generator by gravity and in heat exchange relation with weak absorption liquid flowing from said generator to said absorber and means including a portion of said conduit means for conducting another stream of strong absorption liquid from said sump through said analyzer and to said generator by gravity and vapor from said generator to said analyzer.

14. In a continuous absorption refrigerating system a generator, a condenser, an absorber having a sump, an analyzer positioned below said sump, conduit means including said analyzer for conducting vapors from said generator to said condenser, a solution liquid circuit including means to conduct weak absorption liquid from said generator to said absorber, means to conduct a portion of the strong absorption liquid from said sump to said generator in heat exchange relation with weak absorption liquid flowing from said generator to said absorber and means to conduct another portion of strong absorption liquid from said sump through said analyzer and to said generator and means for circulating said absorption liquid in said circuit.

15. In an absorption refrigerating apparatus, a generator, an absorber having a liquid sump, an elongated analyzer located below the liquid level in said sump, an absorption liquid circuit, means for circulating absorption liquid in said circuit and said circuit including means for conducting absorption liquid from said generator through said absorber to said sump, means for conducting a portion of the strong absorption liquid from said sump to one end of the analyzer, means for conducting another portion of said strong absorption liquid from said sump, in heat exchange relation with the weak absorption liquid, to the other end of said analyzer, and means to connect said analyzer and generator so as to conduct liquid from said other end of the analyzer to the generator and vapor from said generator to said other end of said analyzer.

16. In an absorption refrigerating apparatus, a generator, a condenser, an absorber having a liquid sump, a conduit for vapors from said generator to said condenser, an absorption liquid circuit and means for circulating absorption liquid in said circuit, said circuit including an elongated vessel below the liquid level in said sump for bringing vapors in said vapor conduit into heat exchange relationship with strong absorption liquid flowing from the absorber to the generator, means for conducting absorption liquid from the generator through the absorber and to said sump, means for conducting a portion of the strong solution liquid from said sump to one end of said vessel and means for conducting another portion of said strong absorption liquid from said sump, into heat exchange relation with the weak absorption liquid and to the other end of said vessel, said vessel, circuit and vapor conduit being so connected, that solution vapor condensed in said vessel by heat exchange with strong absorption liquid merges with strong absorption liquid conducted to both ends of said vessel and flows to said generator and vapor generated from said strong solution in said vessel merges with vapor from said boiler and flows to said condenser therewith.

17. In an absorption refrigerating apparatus, a generator, an elongated analyzer, an absorber, means for conducting weak absorption liquid from said generator to said absorber, means for conducting a portion of the strong absorption liquid from said absorber to one point in the analyzer, means for conducting another portion of said strong absorption liquid from said absorber in heat exchange relation with said weak absorption liquid to another point in said analyzer spaced from said one point and means for conducting liquid from said another point of said analyzer to said generator and for conducting vapor from said generator to said another point of said analyzer.

18. In an absorption refrigerating apparatus, a generator, an elongated non-submerged analyzer, an absorber, means for conducting weak absorption liquid from said generator to said absorber, means for conducting a portion of the strong absorption liquid from said absorber to a point near one end of the analyzer, means for conducting another portion of said strong absorption liquid from said absorber in heat exchange relation with said weak absorption liquid to a point near the other end of said analyzer, and means for conducting liquid from said other end of the analyzer to said generator and for conducting vapor from said generator to said other end of said analyzer.

19. In an absorption refrigerating apparatus, a generator, an elongated analyzer, an absorber, means for conducting weak absorption liquid from said generator to said absorber, means for dividing the strong absorption liquid into two different sized portions, means for conducting the smaller portion of the strong absorption liquid from said dividing means to one point in the analyzer, means for conducting the larger portion of said strong absorption liquid from said dividing means in heat exchange relation with said weak absorption liquid to another point of said analyzer spaced from said one point, and means for conducting liquid from said another point of said analyzer to said generator and for conducting vapor from said generator to said another point of said analyzer.

RUDOLPH S. NELSON.